No. 843,348. PATENTED FEB. 5, 1907.
J. Z. MILLER.
SHIFTER FASTENER FOR VEHICLE TOPS.
APPLICATION FILED JULY 26, 1906.

WITNESSES:
W. M. Gentte.
N. Allemong.

INVENTOR.
John Z. Miller
BY V. H. Lockwood
ATTORNEY.

UNITED STATES PATENT OFFICE.

JOHN Z. MILLER, OF INDIANAPOLIS, INDIANA.

SHIFTER-FASTENER FOR VEHICLE-TOPS.

No. 843,348.  Specification of Letters Patent.  Patented Feb. 5, 1907.

Application filed July 26, 1906. Serial No. 327,892.

*To all whom it may concern:*

Be it known that I, JOHN Z. MILLER, of Indianapolis, county of Marion, and State of Indiana, have invented a certain new and useful Shifter-Fastener for Vehicle-Tops; and I do hereby declare that the following is a full, clear, and exact description thereof, reference being had to the accompanying drawings, in which like numerals refer to like parts.

The object of this invention is to provide a novel means for fastening vehicle-tops in place on vehicles, so that the same will be strong and readily removable and attachable.

The full nature of the invention will be more fully understood from the accompanying drawings and the following description and claims.

Figure 1:
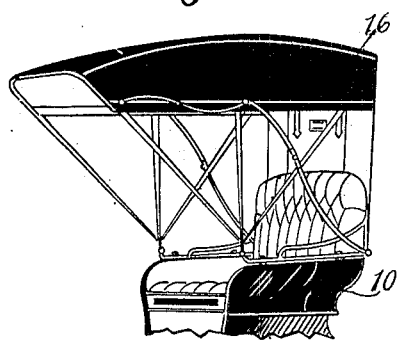
Figure 2:
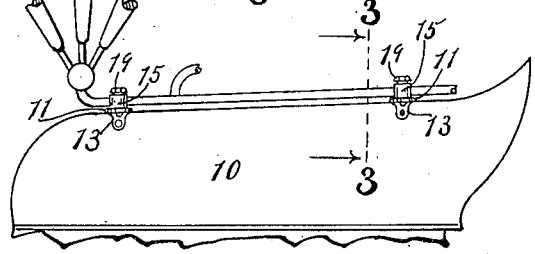
Figure 3:
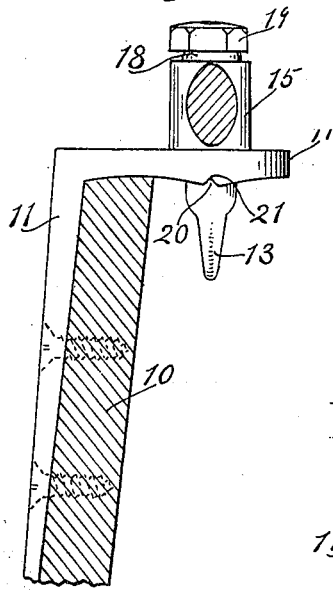
Figure 4:
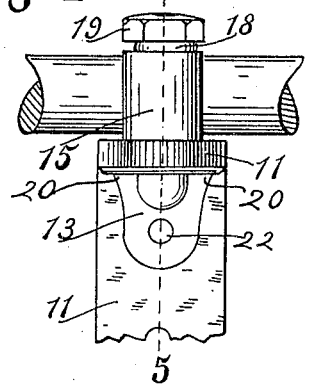
Figure 5:
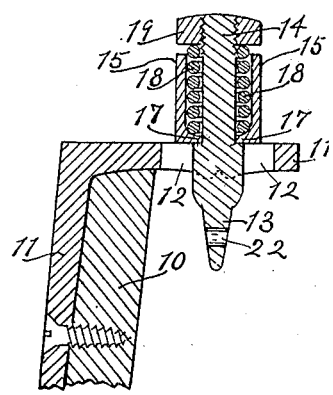
Figure 6:
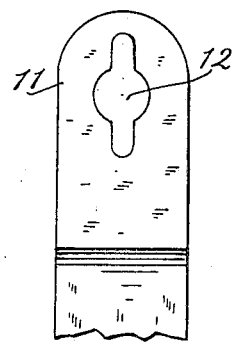
Figure 7:
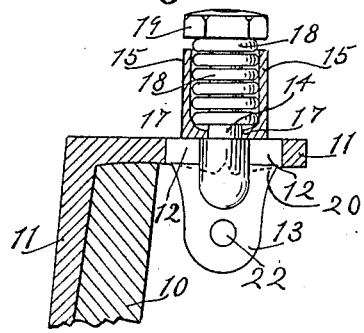

In the drawings, Figure 1 is a perspective view of the seat and top of a buggy provided with said fastening means. Fig. 2 is a side elevation of the upper part of the seat of a vehicle and the means for attaching the buggy-top thereto, parts being broken away. Fig. 3 is a section on the line 3 3 of Fig. 2 on an enlarged scale. Fig. 4 is a side elevation of the upper part of a seat-iron and a portion of the shifting-rail, and the fastening means. Fig. 5 is a section on the line 5 5 of Fig. 4. Fig. 6 is a plan view of the upper portion of a seat-iron. Fig. 7 is the same as Fig. 5, with the bolt-head turned longitudinally of the slot in the seat-iron ready for the removal.

There is shown herein a seat-panel 10 of a buggy having secured on each side thereof a pair of seat-irons 11 of the usual shape, the upper horizontal end being, however, provided with a slot 12, extending longitudinally thereof and widened in the middle portion to receive a head 13 of the screw-bolt 14, that secures the shifting-rail 15, on which a buggy top 16 is mounted to a seat-iron. Said shifting-rail is widened, preferably, at the point of attachment of said part to form a sleeve-like bearing in which there is an opening or hole for the bolt that is reduced or provided with a shoulder 17, upon which a strong spiral spring 18 rests. The nut 19 on said bolt tightens down upon said spring and the sleeve-like enlargement of the shifting-rail. This provides a strong connection between the seat-panel and the shifting-rail, and yet said rail can yield vertically. The head 13 of said bolt is preferably flattened, so that the upper edges 20 thereof extend in opposite directions on each side of the bolt and are preferably sharp or tapering somewhat, so they will fit into notches 21 on the under side of the horizontal upper end of the seat-iron and prevent said bolt from turning until it is turned forcibly. The spring holds the upper surfaces or edges 20 of said bolt-head in said notches, and the spring should be strong enough to make a firm connection.

The buggy-top is removed by turning the heads of the bolts with any suitable too,l or by a nail or like article, that may be inserted in the hole 22 in said heads, or by the thumb and finger, although the springs should be strong enough that the bolt could not be turned by the fingers. The slot 12 permits the escape of the head of the bolt when the latter is turned parallel with said slot, and then the top may be lifted off. It may be as readily secured in place.

There are several advantages arising from the foregoing beside the ease of removing a buggy-top, one of which is after the buggy-top is removed the bolt and head are always connected therewith, so there is no opportunity of them becoming separated and lost like the nut and bolt arrangement heretofore used for securing the buggy-top in place.

While I have shown this invention in connection with a buggy-top, I do not wish to be limited to its use in connection with a buggy, for it may also be used with automobiles and other vehicles having removable tops, and while a coil-spring is shown I do not wish to be limited to a coil-spring.

What I claim as my invention, and desire to secure by Letters Patent, is—

1. A fastener for vehicle-tops including one member secured to the vehicle-top, another member secured to the seat of the vehicle, one of said members being slotted and notched transversely of the slot, and a bolt passing through the other member with a widened head that is insertible in said slot and when turned transversely thereof fits in said notch, and a spring acting on said bolt to hold the head thereof in said notch.

2. A fastener for vehicle-tops including one member secured to the vehicle-top, another member secured to the seat of the vehicle, one of said members being slotted and notched transversely of the slot and the other member provided with a hole for the passage of the bolt that is enlarged above the lower end thereof, a bolt extending through said hole with a flattened head adapted to enter said slot and when turned transversely thereof engage said notch, a spiral spring about said bolt in the enlarged portion of the hole containing said bolt, and a nut on said bolt, substantially as set forth.

In witness whereof I have hereunto affixed my signature in the presence of the witnesses herein named.

JOHN Z. MILLER.

Witnesses:
HELEN B. McCORD,
N. ALLEMONG.